United States Patent
Öhman et al.

(10) Patent No.: US 6,444,081 B2
(45) Date of Patent: *Sep. 3, 2002

(54) METHOD OF APPLYING GLUE SIMULTANEOUSLY TO TWO FACING, ADJACENT DISC SURFACES

(75) Inventors: Ove Öhman, Uppsala; Lars Bering, Täby, both of (SE)

(73) Assignee: Odme International B.V., Veldhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/732,872

(22) Filed: Dec. 11, 2000

Related U.S. Application Data

(63) Continuation of application No. 09/169,925, filed on Oct. 6, 1998, now abandoned, which is a continuation of application No. PCT/SE97/00773, filed on May 12, 1997.

(30) Foreign Application Priority Data

May 13, 1996 (SE) ................................................ 9601816

(51) Int. Cl.⁷ ............................ C09J 5/04; B32B 31/04; B05B 1/14; B05B 1/20
(52) U.S. Cl. .................... 156/295; 156/292; 156/87; 239/589; 239/598; 239/599; 239/601
(58) Field of Search ............................... 156/295, 292, 156/285, 275.5, 275.7, 578, 74, 87; 239/589, 598, 599, 601

(56) References Cited

U.S. PATENT DOCUMENTS

| | | | |
|---|---|---|---|
| 1,979,649 A | | 11/1934 | Stephenson |
| 4,646,977 A | | 3/1987 | Iwamura et al. |
| 4,989,788 A | | 2/1991 | Bendig et al. |
| 5,056,440 A | | 10/1991 | Eissens |
| 5,975,431 A | | 11/1999 | Harita et al. |
| 6,042,684 A | * | 3/2000 | Ohman ........................ 156/285 |

FOREIGN PATENT DOCUMENTS

| | | |
|---|---|---|
| JP | 61190738 | 8/1986 |
| JP | 62006449 | 1/1987 |
| JP | 62173234 | 7/1987 |
| JP | 09035335 | 2/1997 |

\* cited by examiner

Primary Examiner—J. A. Lorengo
(74) Attorney, Agent, or Firm—Young & Thompson

(57) ABSTRACT

A nozzle for simultaneous application of a string of glue on two facing adjacent disc surfaces, especially for gluing together two optical disc elements to form a DVD. In order to make possible higher glue application rates and smaller dimensions of the glue application nozzle, the nozzle can steer the flow towards the facing disc elements. For this purpose, the nozzle has a channel outlet opening which has upper and lower outlet areas and therebetween a constricted outlet area.

7 Claims, 2 Drawing Sheets

US 6,444,081 B2

METHOD OF APPLYING GLUE SIMULTANEOUSLY TO TWO FACING, ADJACENT DISC SURFACES

CROSS REFERENCE TO RELATED APPLICATIONS

This application is a continuation of application Ser. No. 09/169,925, filed Oct. 6, 1998 now abandoned which is a con of PCT/SE97/00773 filed May. 12, 1997.

BACKGROUND OF THE INVENTION

The present invention relates to a nozzle for simultaneous application of a string of glue on two facing, adjacent disc surfaces, especially for gluing together two optical disc elements of a digital video disc.

Our previously filed Swedish patent application SE-A-9601263-8 describes a process and a device for gluing together two optical disc elements, especially substrates for digital audio, video or computer discs, such as DVD:s (Digital Video Discs). The gluing together of the two disc elements is done by placing them coaxial to each other on individual holders in such a manner that a preferably radially outwardly widening gap is formed between the disc elements, whereafter a tubular glue injection nozzle is inserted into the gap to dispense a liquid adhesive so that it will essentially come into simultaneous contact with facing sides of the two disc elements, which are rotated at the same time one rotation to form a circular string of glue in contact with the two disc elements. When inserting the nozzle tube into the gap, they come very close to the disc elements. There will be only a few tenth of a millimeter play between the nozzle tube and the disc elements.

By increasing the rotational speed of the disc elements when applying glue and increasing at the same time the dispensing pressure of the adhesive, it is possible to increase the distance between the nozzle opening and the location on the disc elements where the glue string is to be applied and thus achieve a greater margin of safety against contact or hitting between the nozzle and the disc elements.

SUMMARY OF THE INVENTION

In order to assure that a major portion of the glue flow from the nozzle is directed towards and strikes the opposing disc element surfaces at the same time and that a smaller portion of the glue flow will flow straight ahead into the gap between the disc elements, it is suggested in accordance with the present invention that the nozzle have a channel outlet opening with upper and lower outlet areas and therebetween a constricted outlet area.

According to a preferred embodiment of the invention the nozzle has the shape of a tubular element with an axially forwardly directed, constricted end opening and two diametrically opposite, radially outwardly directed openings near the end of the tubular element.

BRIEF DESCRIPTION OF THE DRAWINGS

The invention will be described in more detail below with reference to the accompanying drawings of which.

BRIEF DESCRIPTION OF THE DRAWINGS

Figure 1:
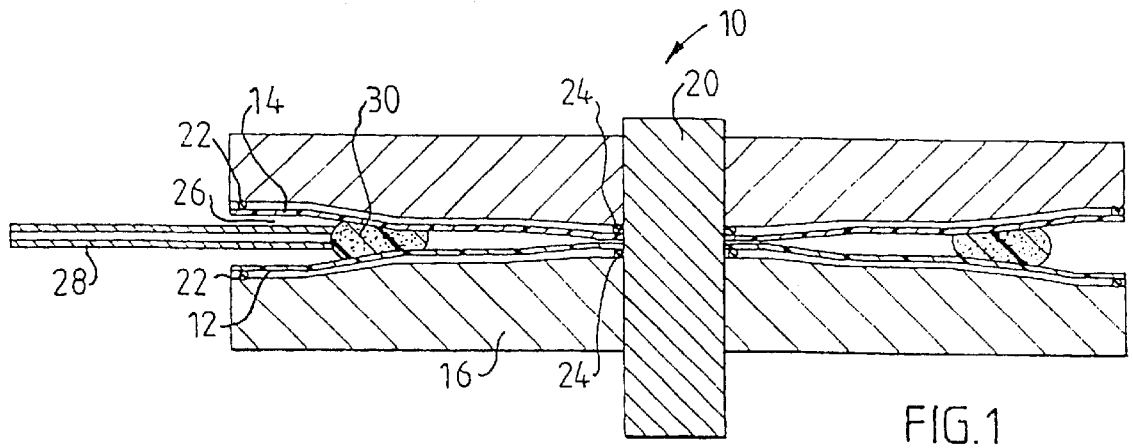
FIG. 1 shows schematically a cross-section of a device for gluing together two disc elements in a stage when a glue application nozzle is inserted into a widened gap between the disc elements.

FIG. 1 shows a device, generally designated 10, for gluing together two disc elements 12,14 to form a so-called DVD. The device 10 comprises a lower disc holder 16 and an upper disc holder 18, preferably of identical construction. The disc holders 16,18 are rotatable about a center shaft 20. The holders 16,18 have outer and inner sealing rings 22 and 24, respectively, and are otherwise of the construction described in more detail in our co-pending patent application SE-A-9601815-5 to make possible, with the aid of vacuum, bending or curving of the radially outer portion of the disc elements 12, 14 to thereby form a radially outwardly widening gap 26 therebetween, so that the glue application nozzle 28 can be inserted into the gap 26 and at the same time apply a string of glue 30 on the facing surfaces of the disc elements 12, 14.

A previously used glue application nozzle has in this context had a circular cross-section with an outlet opening, which has provided a somewhat disadvantageous distribution of the dispensed adhesive in the gap between the disc elements. According to the present invention, there is now suggested a nozzle which has relatively large upper and lower outlet areas and, located therebetween, a middle outlet area of relatively small or non-existent outlet cross-sectional area.

Figure 2:
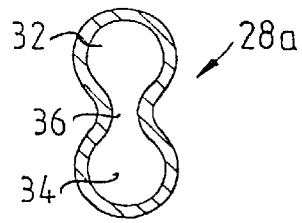
FIG. 2 shows on a larger scale a first example of the configuration of the outlet opening of the glue application nozzle.

FIG. 2 shows a first example of a nozzle 28a according to the invention, where the outlet opening has essentially the cross-sectional shape of an eight with upper and lower outlet areas 32 and 34, respectively, and an intermediate constricted section 36. It should be kept in mind that the cross-sectional dimensions of the nozzle opening are in practice very small. For example, the height of the nozzle opening in FIG. 2 can be less than one millimeter.

Figure 3:
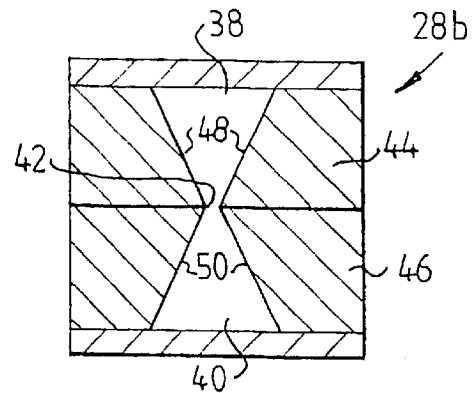
FIG. 3 shows a second embodiment on a larger scale where the outlet cross-section of the glue application nozzle is made in an hour-glass shape by means of a micromechanical production process.
Figure 5:
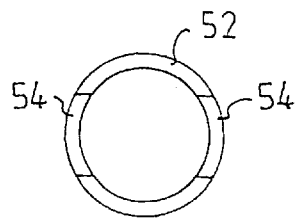
FIG. 5 is an end view of the blank in FIG. 4.

FIG. 3 shows another embodiment 28b of the nozzle according to the present invention, where the opening configuration has an hour-glass shape with upper and lower outlet areas 38 and 40, respectively, and an intermediate constricted area 42. The manufacture of the nozzle configuration according to FIG. 3 can be achieved by micromechanical technology, which is known per se, applied to the shaping of separate portions 44 and 46 which define the nozzle walls 48, 50.

Figure 4:
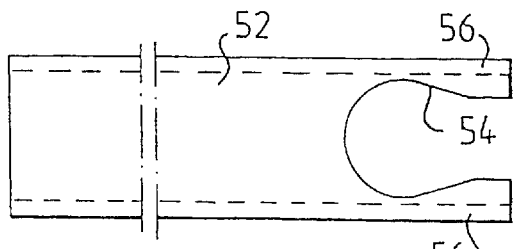
FIG. 4 is a plan view of a blank for a preferred embodiment of the nozzle according to the invention.
Figure 6:
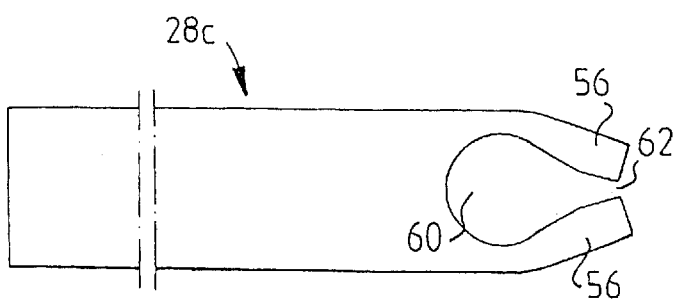
FIG. 6 shows a finished nozzle in plan view based on the blank in FIG. 4.

FIG. 4 shows a preferred embodiment of a blank 52 of a nozzle 28c (FIGS. 6–8) according to the present invention. The blank 52 consists of a tubular element, the end of which has a cavity 54 which expands axially inwards in diametrically opposed portions in the end portion of the tubular element. Opposing wall legs 56 are thus formed in the tubular element. These wall legs 56 are bent in a working step towards each other to converging shape, as shown in FIG. 6. This forms a constricted axial outlet opening 58 of oval shape and two diametrically opposite radial outlet openings 60, which narrow towards the axial opening 58.

Figure 7:
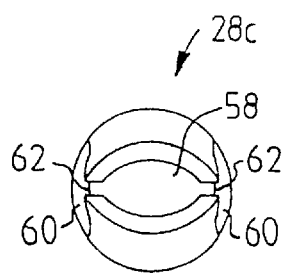
FIG. 7 is an end view of the nozzle in FIG. 6.

Via a small gap 62, the radial openings 60 can be joined to the axial opening 58 (FIGS. 6 and 7). In its position for use, the major axis of the oval axial outlet opening 58 is oriented vertically.

Figure 8:
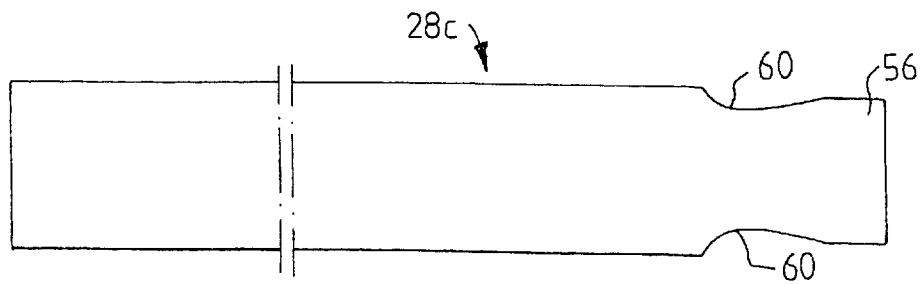
FIG. 8 is a side view of the nozzle in FIG. 6.

FIG. 8 shows the nozzle 28c in a side view, i.e. in a position corresponding to the position of the nozzle 28 in FIG. 1.

By virtue of the suggested cross-sectional configuration of the nozzle opening, the height dimension of the nozzle tube can be made smaller and thus the outlet area of the opening correspondingly smaller with a larger pressure drop and a higher flow speed as a result. The flow distribution of the injected glue can, however, be steered towards the disc elements in the desired manner by the suggested opening configuration. It is in this case also conceivable to angle the upper and lower opening areas somewhat away from each other so that diverging jets of glue are produced.

What is claimed is:

1. A method of applying glue simultaneously to two facing, adjacent disc surfaces, the method comprising the steps of:

inserting an outlet of a tubular nozzle between the two facing, adjacent disc surfaces, the outlet having diametrically opposed outlet areas; and directing from the diametrically opposed outlet areas of the nozzle a flow of glue simultaneously onto the two facing, adjacent disc surfaces.

2. The method of claim 1, wherein the two disc surfaces are rotated during the step of directing the flow of glue.

3. The method of claim 1, wherein a distance between the two facing, adjacent disc surfaces increases as a distance from a center of the two facing, adjacent disc surfaces increases.

4. The method of claim 1, further comprising the step of constricting a flow of glue from an axial end of the nozzle between the diametrically opposed outlet areas.

5. The method of claim 1, further comprising the step of stopping a flow of glue from an axial end of the nozzle between the diametrically opposed outlet areas.

6. The new method of claim 1, wherein the nozzle is provided with a closed axial end for preventing an axial flow during application of the glue.

7. A method of applying glue simultaneously to two facing, adjacent surfaces of two optical discs, the method comprising the steps of:

bending the two optical discs so that a distance between the two facing, adjacent disc surfaces increases as a distance from a center of the two facing, adjacent disc surfaces increases;

inserting an outlet of a tubular nozzle between the two facing, adjacent disc surfaces, the outlet having diametrically opposed outlet areas and a constricted outlet area between the diametrically opposed outlet areas;

rotating the two optical discs; and directing from the diametrically opposed outlet areas of the nozzle a flow of glue simultaneously onto the two facing, adjacent disc surfaces while constricting a flow of glue from the constricted outlet area.

* * * * *